Figure 1:
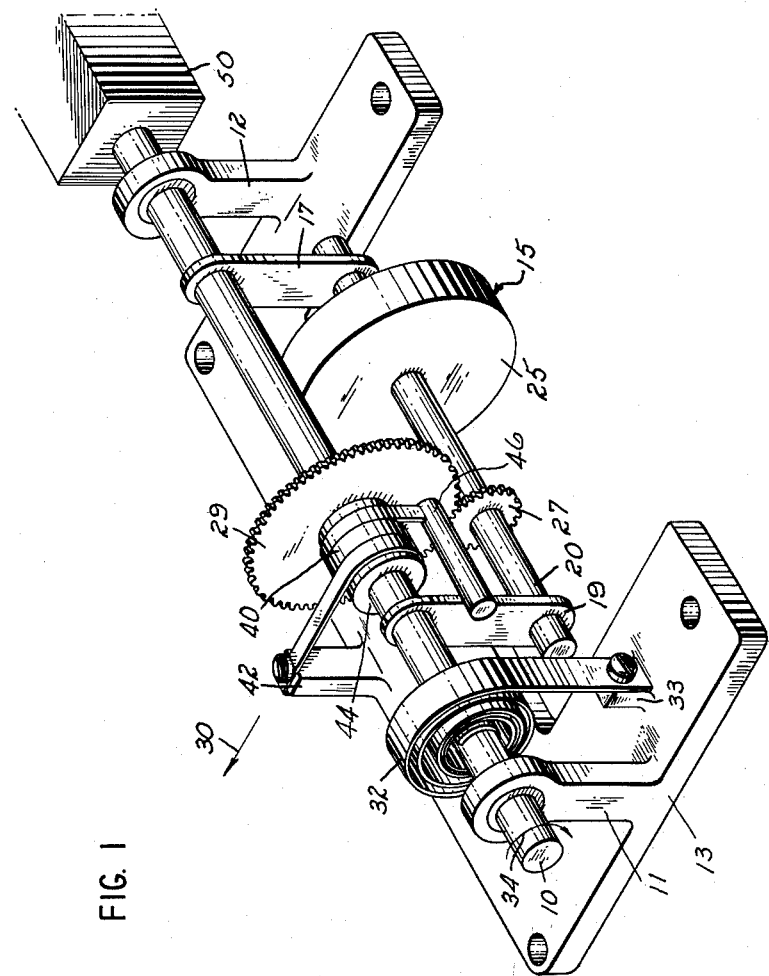

July 16, 1963

J. D. HEINZMANN 3,097,533

FORCE BALANCE ACCELEROMETER

Filed Sept. 11, 1959

2 Sheets-Sheet 1

INVENTOR.
JOHN D. HEINZMANN
BY
*Lindsey and Prutzman*
ATTORNEYS

July 16, 1963

J. D. HEINZMANN 3,097,533

FORCE BALANCE ACCELEROMETER

Filed Sept. 11, 1959

2 Sheets-Sheet 2

INVENTOR.
JOHN D. HEINZMANN
BY
Lindsey and Prutzman
ATTORNEYS

United States Patent Office 3,097,533
Patented July 16, 1963

3,097,533
FORCE BALANCE ACCELEROMETER
John D. Heinzmann, Middletown, Conn., assignor to Raymond Engineering Laboratory, Inc., Middletown, Conn., a corporation of Connecticut
Filed Sept. 11, 1959, Ser. No. 839,484
18 Claims. (Cl. 73—490)

This invention relates to accelerometers and is particularly concerned with accelerometers of the force balance type that provide an integrated output.

Integrating accelerometers are often used in fuzing, guidance, telemetering and control systems in missiles and projectiles to provide velocity and distance information and/or perform certain functions related to this information. In such systems a mass is influenced by the acceleration of the carrier vehicle. The resultant motion of this mass with respect to the carrier vehicle is determined by the characteristics of the restraining forces presented to the mass. Certain restraining elements can conveniently provide the first and second integrals of acceleration (velocity and distance). In open loop systems where all the energy to drive the restraining element is derived from the mass itself, the maximum value of the integrals is limited by practical physical considerations. The magnitude of the mass and the distance through which it is allowed to move will determine the accuracy of the integral, especially where large integrals are desired because friction in gears and bearings directly affect this accuracy. In this type of system extreme care is required in the manufacture of each and every component part so that the total contribution of errors is not excessive.

Force balance accelerometer systems have been proposed to minimize the aforementioned limitations of the open-ended systems. In a force balance system, the acceleration is detected and a force is generated which is substantially equal and opposite to the accelerating force preventing the sensing mass from moving with respect to the vehicle. However, known force balance accelerometers are generally quite complex and usually require electronic amplifiers and complex servo mechanisms to generate and apply the balancing force. This balancing force then reacts against a restraint as in the open-ended systems.

It is accordingly an object of this invention to provide an improved force balance accelerometer whose operation is dependent only upon a single mechanical input power source.

It is a further object of this invention to provide an improved force balance accelerometer having an integrated output, that is susceptible to extreme miniaturization, that is exceptionally reliable and economical to produce, and that exhibits high accuracy with little regard for the accuracy of most of the component parts.

It is a still further object of this invention to provide an improved force balance accelerometer wherein the input to the integrating element can be chosen independently of the magnitude of the accelerating forces.

It is an additional object of this invention to provide a force balance accelerometer having an integrated output that is virtually unaffected by the losses and accuracy of the system components.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 2:
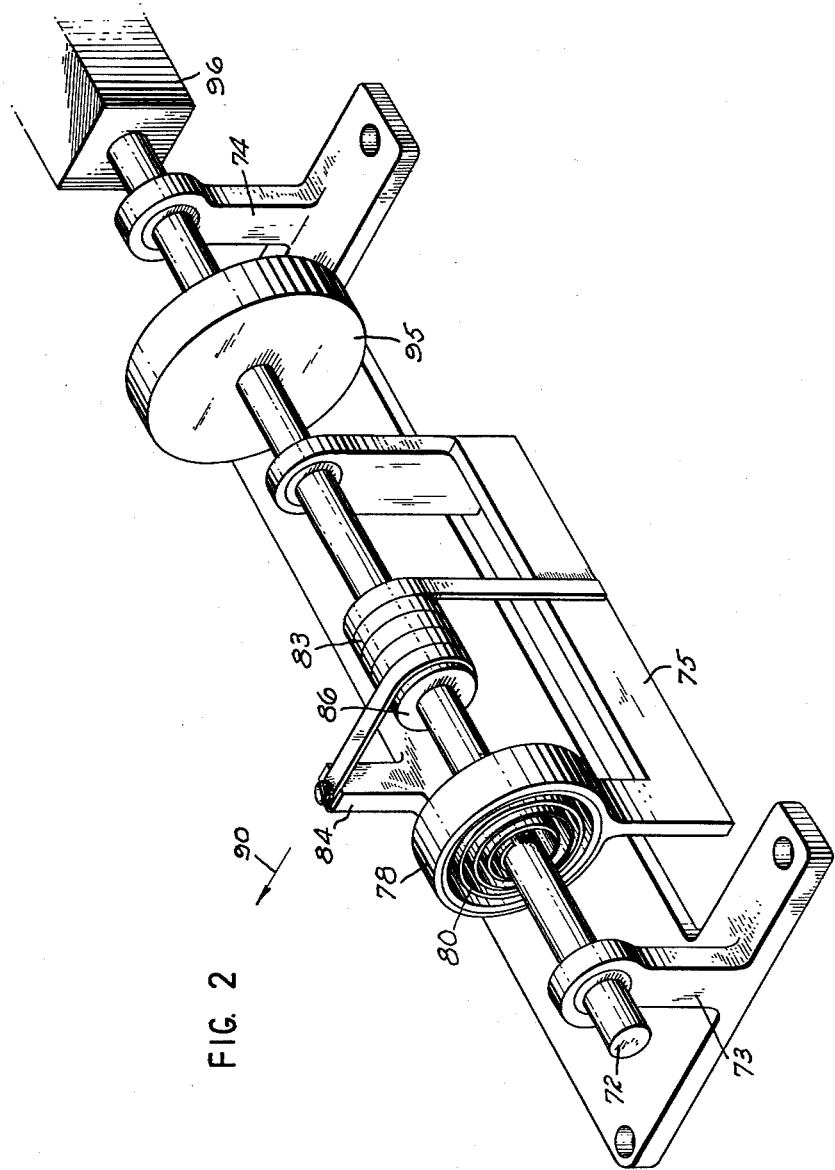

In the drawings:

FIG. 1 is a perspective view of one embodiment of my improved force balance accelerometer; and FIG. 2 is a perspective view of a second embodiment of my improved force balance accelerometer.

Referring first to FIG. 1, it is seen that I have illustrated an integrating force balance accelerometer that is completely mechanical in nature and that does not require any electronic amplification, hydraulic or electrical feedback, etc. This accelerometer has a main shaft 10 rotatably supported on bearing pedestals 11 and 12, which, in turn, are supported on frame 13. Pivotally mounted on shaft 10 is the acceleration sensitive assembly 15, generally comprising arms 17 and 19, rotatably supported on shaft 10, shaft 20 rotatably supported by arms 17 and 19 in generally parallel relationship with shaft 10, and flywheel 25 rigidly affixed to shaft 20. Flywheel 25 is connected to shaft 10 for rotation therewith by gear 27, affixed to shaft 20, and gear 29, affixed to shaft 10. In the embodiment of FIG. 1, acceleration sensitive assembly 15 functions as a pendulum and is arranged to be movable in response to acceleration in a direction generally perpendicular to the axes of shafts 10 and 20 and in the direction of arrow 30. Spring motor 32 is coiled about shaft 10 and has one end affixed thereto and its other end affixed to frame 13 at point 33. Spring motor 32 is arranged to rotate shaft 10 in a clockwise direction as shown by arrow 34. It is noted that any suitable type of motor can be used to supply the force to rotate shaft 10.

In order to prevent motor 32 from applying torque to shaft 10 when the accelerometer thus far described is at rest, spring brake or clutch 40 is provided. Brake 40 is wrapped around drum 44, affixed to shaft 10, and has one end affixed to frame 13 at point 42 and its other end attached to arm 46 carried by arm 19 of assembly 15. Brake 40 loosely engages drum 44 adjacent gear 29 and is more tightly wrapped at the other end of drum 44. Further understanding of my invention can best be obtained from a description of the operation of the foregoing structure.

Assuming the accelerometer of FIG. 1 is accelerated in the direction of arrow 30, acceleration sensitive assembly 15, including the combined mass of flywheel 25, arms 17, 19 and 46, gear 27 and shaft 20 is displaced in a counterclockwise direction about shaft 10. This counterclockwise movement causes arm 46 to rise and release spring brake 40 by an amount proportional to the acceleration and permit spring motor 32 to rotate shaft 10 in a clockwise direction. The rotation of shaft 10 is communicated to shaft 20 through gears 29 and 27 so as to rotate flywheel 25 in a counterclockwise direction. The clockwise reaction force to the rotation of flywheel 25 rotates assembly 15 in a clockwise direction thereby tightening spring brake 40 and resisting further rotation of shaft 10. Under ideal conditions and with proper selection of spring motor force, flywheel mass, and brake characteristics, the accelerometer of my invention will function as a true force balance accelerometer for a given range of acceleration by generating a force that is equal and oppositely directed to the accelerating force tending to cause rotational displacement of the acceleration sensitive assembly. Under practical conditions, assembly 15 may tend to oscillate mildly even under relatively constant acceleration thereby causing flywheel 15 to be accelerated by impulses. The magnitude of the acceleration being sensed is represented by the angular acceleration of shaft 10. Because of the inherent qualities of a flywheel, the accumulated rotation of shaft 10 represents the double integral of the acceleration which causes the displacement of the pendulum from its zero acceleration or rest position. Thus, the distance traveled by my accelerometer is conveniently and accurately measured.

The accumulated rotation of shaft 10 under a known or unknown acceleration in the appropriate direction can be utilized to control the output of related system or to perform a control function directly. For example, shaft 10 can be extended into control box 50 in which is provided a cam driven by shaft 10 to actuate appropriate switch contacts after a predetermined amount of shaft rotation. Also, shaft 10 can be connected directly to a helical potentiometer mounted in box 50 to provide an electrical signal proportioned to the several revolutions of the main shaft. Further, the angular velocity of the flywheel and output shaft represents the first integral of acceleration and can be indicated by the voltage output of a tachometer.

An additional advantage of my system resides in the fact that the input torque produced by the spring motor can be made as large as desired so as to control the operation of a valve or other control device by direct connection to shaft 10. This feature demonstrates that the spring brake or clutch 40 is a torque amplifier since the torque produced by even very small acceleration displacements of the acceleration sensitive assembly is utilized to control a much larger torque applied to shaft 10. Of course, other torque amplifiers can be conveniently utilized to control the rotation of the output end of shaft 10.

The many advantages of my invention can be further understood by referring to the embodiment of FIG. 2 which represents a simplified force balance accelerometer utilizing my inventive concept. Main shaft 72 is rotatably supported on frame member 73 and 74 and has pivotally mounted thereon pendulum 75. Pendulum 75 is generally U-shaped having one end rotatably supported on shaft 72 and having its other end provided with an enlarged ring or motor housing 78. Spring motor 80 is mounted between ring 78 and shaft 72 and is arranged to rotate shaft 72 in a counterclockwise direction. Spring brake 83 has one end affixed to frame member 84, one end affixed to frame 75, and its intermediate portion wrapped around drum 86, secured to shaft 72. When the accelerometer is accelerated in the direction of arrow 90, frame 75 is displaced in a counterclockwise direction so as to release brake 83 and permit spring motor 80 to rotate shaft 72. However, the reaction force exerted on frame 75 by spring motor 80 causes frame 75 to be urged in a clockwise direction thereby closing brake 83 to oppose rotational motion of shaft 72. The accumulated rotation of flywheel 95 and therefore of shaft 72 represents the double integral of the acceleration which caused the initial displacement of frame 75 as in embodiment of FIG. 1.

Also in a manner similar to the embodiment of FIG. 1, a switch or helical potentiometer can be mounted in box 96 and driven by shaft 72 so as to perform a control function after a given distance has been traversed by the accelerometer of my invention as determined by the double integral of the acceleration producing movement of the accelerometer assembly. The accelerometer of FIG. 2 can be utilized to provide high torque outputs as described for FIG. 1 so as to permit direct driving of high power consuming control elements such as valves and the like. Again the angular velocity of shaft 72 represents the linear velocity of the carrier vehicle.

From the foregoing description of selected embodiments of my invention, it is apparent that a linear damper such as an eddy current brake, a viscous damper, etc., can be used in place of the flywheel so that the accumulated rotation of the main shaft represents the single integral of acceleration.

It has been found that the available torque range of the drive motor can be selected independently of vehicle or frame acceleration and can be made much larger than the open loop system so that bearing and gear losses are a much smaller percentage of the output torque. By placing the gearing on the prime mover side of the clutch, brake, or other torque amplifier, the effect of environment on the gearing is minimized, insofar as the accuracy of the system output is concerned.

It has also been found that my improved accelerometer can be successfully miniaturized thereby reducing costs and improving resistance to shock and vibration without sacrificing accuracy.

As will be apparent to persons skilled in the art, various modifications and adaptations of the structure above described will become readily apparent without departure from the spirit and scope of the invention, the scope of which is defined in the appended claims.

I claim:

1. A force balance accelerometer comprising a rotatably supported shaft, a drive motor operable to rotate said shaft, power delivery control means for regulating shaft rotation, said last-named means including a pendulum mounted for pivotal movement about said shaft and a mechanical torque amplifier interconnecting said pendulum and said shaft whereby the torque produced by displacement of said pendulum in response to acceleration transversely of said shaft permits the torque of said drive motor to rotate said shaft, and mechanical motion transmitting means interconnecting said shaft and said pendulum whereby rotation of said shaft tends to restore said pendulum to the zero acceleration position.

2. The accelerometer as set forth in claim 1 wherein a rotatable mechanical integrating element is driven by said shaft.

3. A force balance accelerometer comprising a shaft, a frame rotatably supporting said shaft, a motor operative to rotate said shaft, means for integrating angular shaft acceleration, a pendulum mounted for pivotal movement about said shaft, a brake on said shaft preventing rotation thereof, said brake being releasable by movement of said pendulum in response to acceleration thereof, and motion transmitting means interconnecting said shaft and said pendulum whereby rotation of said shaft by said motor tends to restore said pendulum to the zero acceleration position.

4. A force balance accelerometer comprising a rotatably supported shaft, a motor arranged to continually urge the rotation of said shaft, mechanical means for integrating angular acceleration of said shaft, a mass mounted for pivotal movement about said shaft, a brake on said shaft normally preventing rotation thereof, means connected to said mass to release said brake when said mass pivots in response to acceleration thereof, and motion transmitting means interconnecting said shaft and said mass whereby rotation of said shaft by said motor tends to restore said mass to the zero acceleration position.

5. A force balance accelerometer comprising a shaft, means rotatably supporting said shaft, a motor operative to rotate said shaft, a frame mounted for pivotal movement about said shaft, said frame being movable in response to acceleration thereof, means rotatable by shaft for integrating angular acceleration of said shaft, a brake engageable with said shaft and normally preventing rotation thereof, said brake being releasable by movement of said frame in response to acceleration thereof, and motion transmitting means interconnecting said shaft and said frame whereby rotation of said shaft by said motor tends to restore said frame to the zero acceleration position.

6. A force balance accelerometer comprising a shaft, frame means rotatably supporting said shaft, a motor operatively connected to rotate said shaft, an integrating element operatively connected for rotation with said shaft, a pivotally supported mass, a brake on said shaft operative to prevent rotation thereof, means operatively interconnecting said brake and said mass to release said brake in response to pivotal movement of said mass caused by acceleration thereof, and motion transmitting means interconnecting said shaft and said mass whereby rotation of said shaft by said motor tends to restore said mass to the zero acceleration position and to close said brake.

7. A force balance accelerometer comprising a first rotatable shaft, a motor operative to rotate said first shaft, a second shaft, means supporting said second shaft for pivotal movement about said first shaft, said last-named means supporting said second shaft for rotation relative thereto, an integrating element mounted on said second shaft, drive means operative between said first shaft and said second shaft to effect rotation of said integrating means with said first shaft, a brake on said first shaft preventing rotation thereof, means interconnecting said brake and said second shaft whereby pivotal movement of said second shaft in response to acceleration of said first shaft causes release of said brake to permit rotation of said first shaft and said second shaft, the reaction force to rotation of said second shaft and said integrating means causing restoration of said second shaft to the zero acceleration position thereby to close said brake.

8. A force balance accelerometer comprising a shaft, means rotatably supporting said shaft, an integrating unit mounted on and rotatable with said shaft, a pendulum pivotally supported on said shaft, a motor operative between said pendulum and said shaft to effect rotation of said shaft in a first direction, a spring brake preventing rotation of said shaft, means interconnecting said spring brake and said pendulum whereby acceleration of said shaft causes said pendulum to pivot thereby releasing said shaft for rotation.

9. A force balance accelerometer as set forth in claim 5 wherein said brake comprises a spring having a plurality of turns embracing said shaft, one end of said spring being connected to a support and the other end being connected to the support means for said second shaft.

10. A force balance accelerometer as set forth in claim 6 wherein said brake comprises a spring having a plurality of turns disposed about and engageable with said shaft, one end of said spring being connected to a frame, the other end being connected to said pendulum.

11. A force balance accelerometer as set forth in claim 5 wherein said means for integration of shaft acceleration comprises a flywheel.

12. A force balance accelerometer as set forth in claim 2 wherein the mechanical integrating element comprises a flywheel.

13. A force balance accelerometer as set forth in claim 3 wherein the means for integrating shaft acceleration comprises a flywheel.

14. A force balance accelerometer as set forth in claim 5 wherein the means for integrating the rotation of said first shaft comprises a flywheel mounted on said second shaft.

15. A force balance accelerometer as set forth in claim 6 wherein the means for integrating shaft rotation comprises a flywheel.

16. A force balance accelerometer comprising a shaft, a frame rotatably supporting said shaft, a motor operative to rotate said shaft, a flywheel mounted on said shaft, said flywheel being operative to integrate shaft rotation, a mass mounted for pivotal movement about said shaft, a brake on said shaft preventing rotation thereof, said brake being releasable by movement of said mass in response to acceleration thereof, motion transmitting means interconnecting said shaft and said mass whereby rotation of said shaft by said motor tends to restore said mass to the zero acceleration position and to close said brake, and control means operatively connected to said shaft, said control means being operable to control the occurrence of an act in accordance with the accumulated rotation of said shaft in response to acceleration as determined by the double integration of the acceleration.

17. A force balance accelerometer comprising a shaft, a frame rotatably supporting said shaft, a motor operative to rotate said shaft, means for integrating shaft rotation, a mass mounted for pivotal movement about said shaft, a brake on said shaft preventing rotation thereof, said brake being releasable by movement of said mass in response to acceleration thereof, motion transmitting means interconnecting said shaft and said mass whereby rotation of said shaft by said motor tends to restore said mass to the zero acceleration position and to close said brake, and control means operatively connected to said shaft to control the occurrence of an act in accordance with the integral of acceleration of said mass.

18. A force balance accelerometer as set forth in claim 3 wherein the means for integration of shaft acceleration comprises a flywheel.

References Cited in the file of this patent

UNITED STATES PATENTS

| 2,109,283 | Boykow | Feb. 22, 1938 |
| 2,819,053 | Pope | Jan. 7, 1958 |
| 2,859,026 | Adamson et al. | Nov. 4, 1958 |
| 2,861,789 | Pope | Nov. 25, 1958 |
| 2,882,034 | Wuerth | Apr. 14, 1959 |
| 2,933,298 | Allison | Apr. 19, 1960 |
| 2,964,949 | Wilcox | Dec. 20, 1960 |

FOREIGN PATENTS

| 526,314 | Great Britain | Sept. 16, 1940 |